US008319360B1

(12) United States Patent  (10) Patent No.: US 8,319,360 B1
Omer  (45) Date of Patent: Nov. 27, 2012

(54) WAVE POWERED GENERATOR

(76) Inventor: John Omer, Aptos, CA (US)

( * ) Notice: Subject to any disclaimer, the term of this patent is extended or adjusted under 35 U.S.C. 154(b) by 0 days.

(21) Appl. No.: 13/151,170

(22) Filed: Jun. 1, 2011

(51) Int. Cl.
F03B 13/10 (2006.01)
F03B 13/12 (2006.01)
H02P 9/04 (2006.01)

(52) U.S. Cl. .......................................... 290/42; 290/53

(58) Field of Classification Search .............. 290/42, 290/53; 405/76, 75; 60/495, 498, 497, 501, 60/504, 496, 502, 500, 505, 506, 507; 417/330, 417/331, 333
See application file for complete search history.

(56) References Cited

U.S. PATENT DOCUMENTS

| | | | | |
|---|---|---|---|---|
| 250,104 A * | 11/1881 | Roberts | ............................ | 60/505 |
| 1,818,066 A * | 8/1931 | Jouy | ................................ | 60/498 |
| 2,749,085 A * | 6/1956 | Searcy | ............................. | 60/505 |
| 3,697,764 A * | 10/1972 | Stanziola et al. | ............... | 290/42 |
| 3,964,264 A * | 6/1976 | Tornabene | ....................... | 405/76 |
| 5,359,229 A * | 10/1994 | Youngblood | .................... | 290/53 |
| 5,424,582 A * | 6/1995 | Trepl et al. | ...................... | 290/53 |
| 7,242,106 B2 * | 7/2007 | Kelly | .............................. | 290/42 |
| 2003/0110767 A1* | 6/2003 | Lee | ................................. | 60/495 |
| 2010/0043425 A1* | 2/2010 | Dragic | ............................ | 60/504 |
| 2010/0045044 A1* | 2/2010 | Patterson | ........................ | 290/53 |

* cited by examiner

Primary Examiner — Julio Gonzalez Ramirez
(74) Attorney, Agent, or Firm — James A. Italia; Italia IP

(57) ABSTRACT

A generator which extracts operating energy from waves of a body of water. A plurality of floats may be suspended beside a rotary power collector. The rotary power collector is arranged to turn unidirectionally as the floats rise and fall vertically on the waves. Rotation of the rotary power collector is transmitted to a rotary generator. The floats may comprise rigid rods each having a finger which engages and rotates the rotary power collector. Alternatively, the floats may be suspended from ropes or the like which are wound around a reel, with the reel driving the rotary power collector in a manner controlled by ratchet action.

9 Claims, 7 Drawing Sheets

WAVE POWERED GENERATOR

FIELD OF THE INVENTION

The present invention relates to generators, and more particularly to a generator which converts surface waves in a liquid to rotary power for rotating a generator.

BACKGROUND OF THE INVENTION

Surface waves in liquids have always been regarded as a potential source of energy, including for electrical power generation. The prior art has suggested the use of elements which are periodically raised and lowered responsive to passing of waves. The oscillatory motion of rising and falling elements may be converted to rotary motion for example, which rotary motion may drive a rotary electrical generator.

SUMMARY OF THE INVENTION

The present invention provides a generator of the type which effectively exploits surface waves on bodies of water, even ordinary small waves which are commonly encountered in swimming pools as a result of people and objects moving through the water. Thus the novel generator need not be reliant upon large passing oceanic waves for effectiveness, nor on strong winds which generate such large passing oceanic waves.

The novel generator provides an array of independent floats which are each connected to a single rotary element. Oscillatory motion of the floats, which rise and fall vertically, is acted on by a ratchet feature enabling the rotary element to be driven by the oscillatory motion of the floats. Rotary motion is ultimately transmitted through a gear arrangement to a rotary type generator.

It is an object of the invention to provide a generator which exploits surface waves of bodies of water.

Another object of the invention is to be able to utilize waves generated by motion of people and objects in a body of water.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
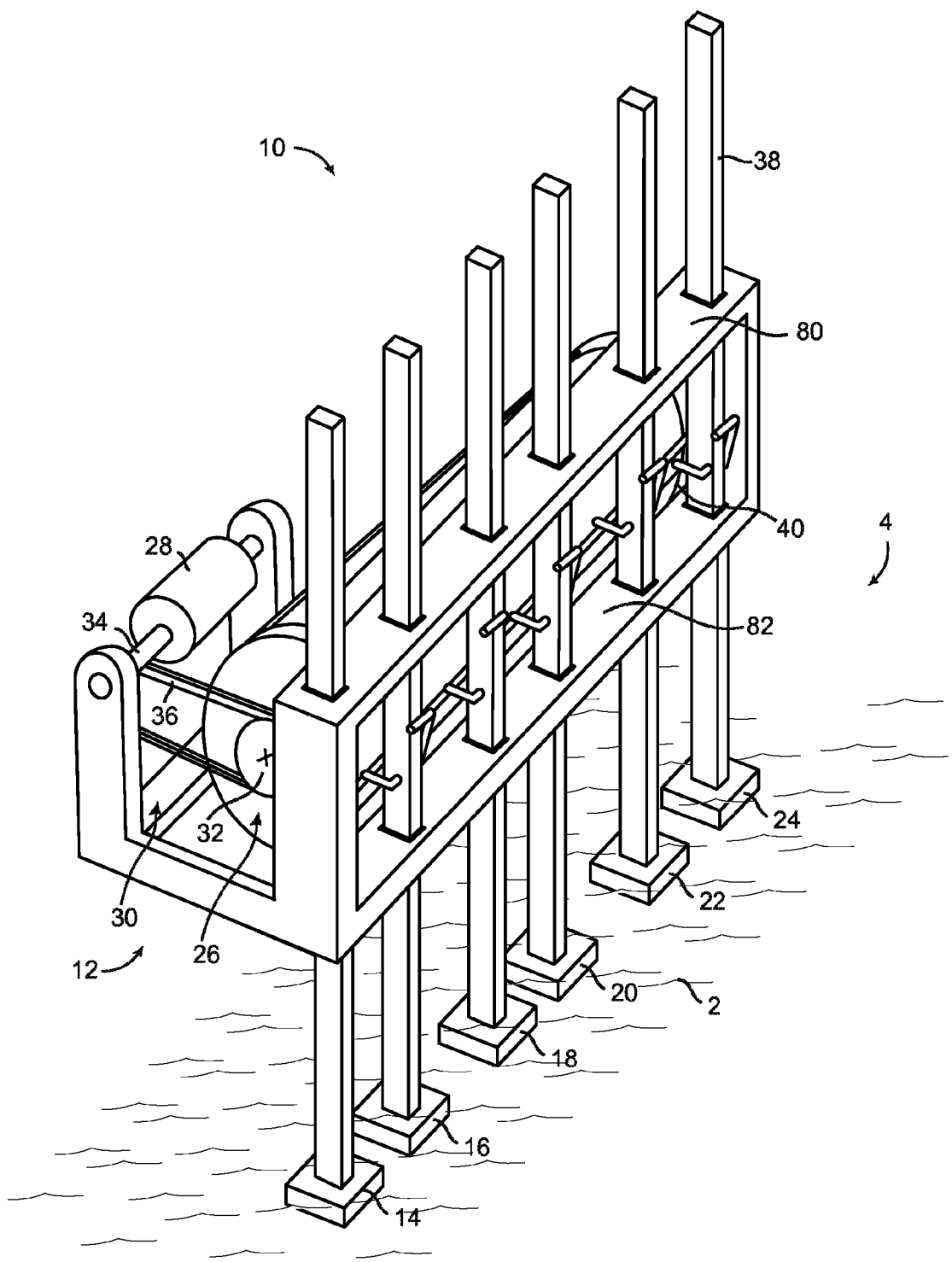
FIG. 1 is an environmental perspective view of a generator according to at least one aspect of the invention.
Figure 9:
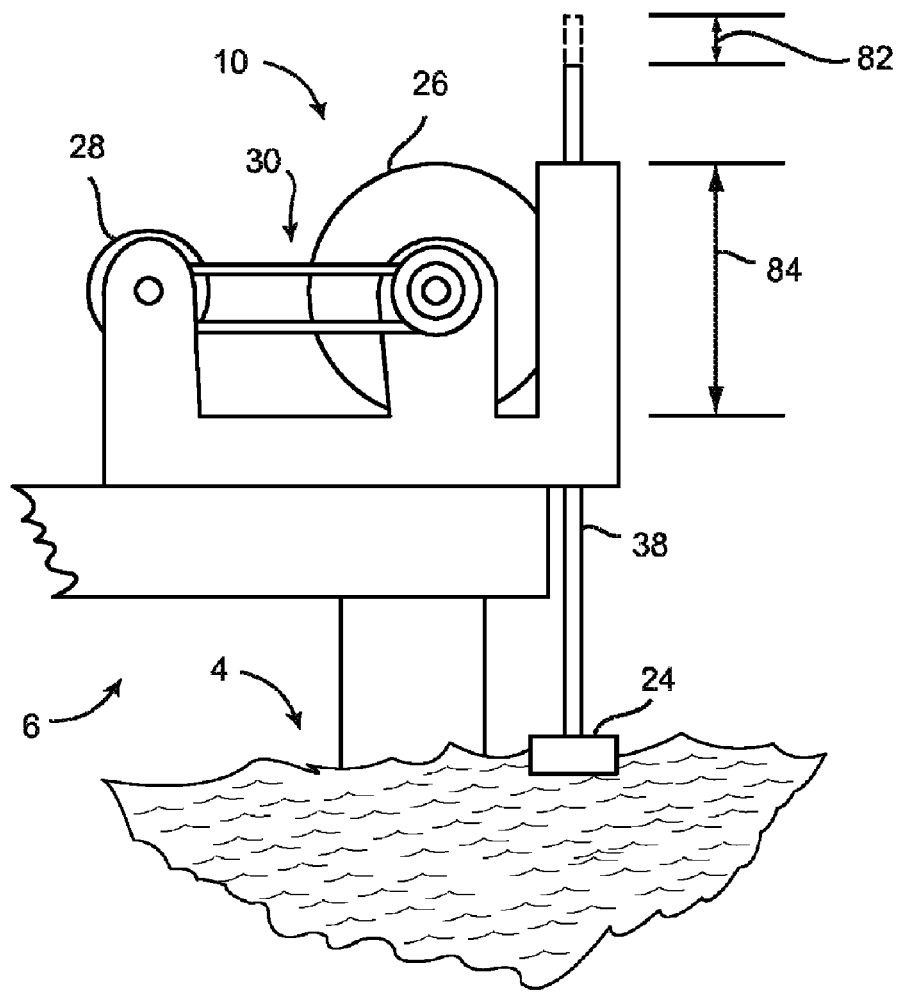
FIG. 9 is an environmental side view of the generator of FIG. 1.

Referring first to FIG. 1, according to at least one aspect of the invention, there is shown a generator 10 which is adapted to exploit surface waves 2 of a body of water 4 to generate electrical power. As employed herein, the term "waves" will be utilized in its broadest interpretation, encompassing swells and other radiating disturbances to the upper surface of a body of water. The generator 10 would normally be resting upon an environmental object such as a dock 6 shown in FIG. 9, but is shown here isolated from environmental objects to avoid obscuring detail. The generator 10 comprises a structural frame 12, a plurality of floats 14, 16, 18, 20, 22, 24 coupled to the structural frame 12 and constrained by the structural frame 12 or an element fixed thereto to oscillate vertically responsively to passing of the surface waves 2. As employed herein, the term "float" signifies any element which can respond to passing of the waves 2. Floats may be partially submerged, as depicted herein, or may comprise fluid reaction surfaces which do not float per se.

A rotatable power collector 26 which is disposed to be rotated in one and only one direction by oscillation of the floats 14, 16, 18, 20, 22, 24 is supported directly or indirectly by the structural frame 12. Each float 14, 16, 18, 20, 22, or 24 is individually coupled to the rotatable power collector 26 in a manner to be described hereinafter. A rotary generator 28 is supported directly or indirectly on the structural frame 12. A drive 30 is disposed to receive rotary inputs from the rotatable power collector 26 and to transmit rotation to the rotary generator 28. The drive 30 may comprise pulleys (such as the pulley 32) fixed to the rotatable power collector 26, a pulley (not visible) fixed to a rotatable shaft 34 which supports electrical components of the rotary generator 28, and a belt 36 which engages the pulleys and transmits torque developed by the rotatable power collector 26 to the rotary generator 28.

Of course, a pulley and belt drive is only one of many possible ways of transmitting power from the rotatable power collector 26 to the rotary generator 28. The pulleys comprising the drive 30 may be of different diameters so that a gearing effect is achieved, where it is desired to modify rotational speed of the rotary generator 28 from the rotational speed of the rotatable power collector 26. Thus the drive 30 may comprise a speed modification feature disposed to receive rotary inputs from the rotatable power collector 26 at a first rate of rotation and to transmit rotation which causes the rotary generator 28 to rotate at a second rate of rotation which is different from the first rate of rotation. If the rotary generator 28 were of appropriate capacity given the power of the rotatable power collector 26, it would be possible to provide direct drive from the latter to the former (this option is not shown).

The floats 14, 16, 18, 20, 22, 24 may all share the following characteristics, and hence only one will be described in detail.

The float 24 may comprise a rod 38 projecting upwardly therefrom, and a drive finger 40 fixed to the rod 38. It should be noted at this point that orientational terms such as upwardly and downwardly refer to the subject drawing as viewed by an observer. The drawing figures depict their subject matter in orientations of normal use, which could obviously change with changes in the way the subject matter is held by a user or set down on environmental surfaces. Therefore, orientational terms must be understood to provide semantic basis for purposes of description, and do not limit the invention or its component parts in any particular way.

Figure 2:
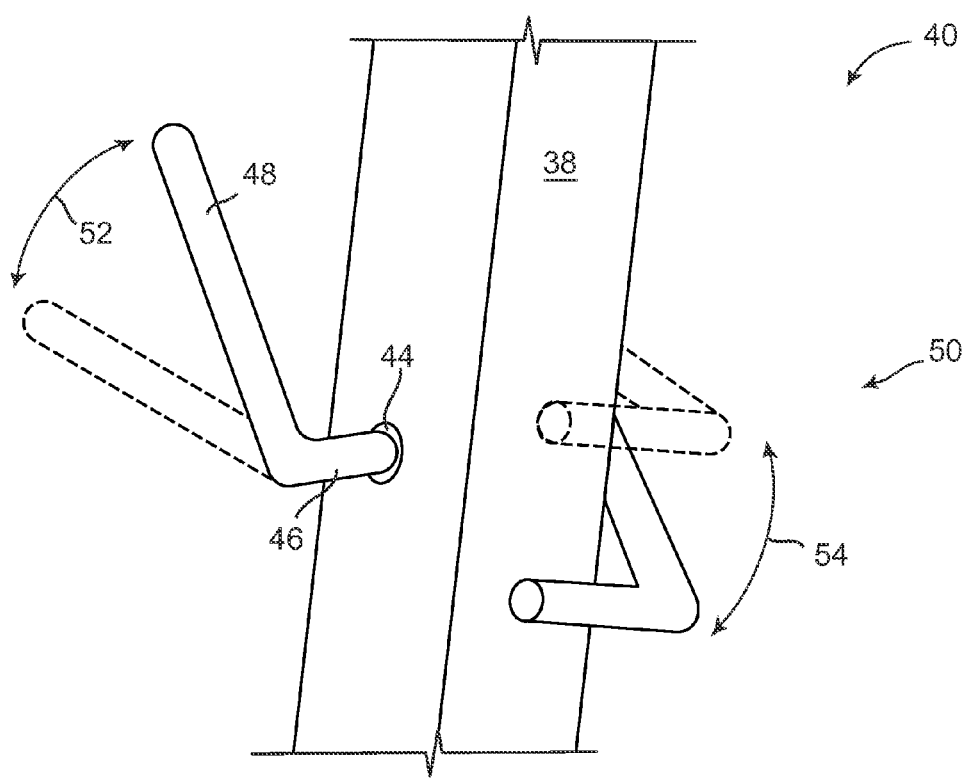
FIG. 2 is an enlarged perspective detail view of a component seen at the upper right of FIG. 1.

The drive finger 40 transmits linear movement of the float 24 and its associated rod 38 to the rotatable power collector 26. It will be appreciated that as the waves 2 pass, the float 24 bobs, or rises and falls relative to the upper surface of the body of water 4. Bobbing is of course defined in a vertical direction. The drive finger 40 imposes a vertical force to a rod 42 which is one of many such rods provided about the periphery of the rotatable power collector 26. As seen in FIG. 2, the drive finger 40 is mounted to the rod 38 in a manner such that the drive finger 40 is pivotal between a drive position (shown in broken lines) in which the drive finger 40 engages and rotates the driven member (i.e., the rod 42), and a retracted position (shown in solid line) in which the drive finger 40 is spaced apart from the driven member and hence does not rotate the driven member.

The drive finger 40 comprises a wire journaled within a hole 44 formed in the rod 38. The wire is bent to form not only a central member 46, which occupies the hole 44 and is horizontal as depicted in FIG. 2, but also a drive section 48 which engages the rod 42 of the rotatable power collector 26, and a travel limit section 50 which establishes interference with the rod 38 when a predetermined degree of rotation of the drive finger 40 within the rod 38 has been attained. Rotation in alternating directions is indicated by arrows 52, 54. As clearly seen in FIG. 3, the drive section 48 of the drive finger 40 is contacting the rod 42 of the rotatable power collector 26.

When the rod 38 descends with the passing of a wave 2, it will rotate the rotatable power collector 26 by pressing on the rod 42. When the rod ascends with the passing of a wave, the arrangement of the bends of the drive finger 40 will allow the latter to pivot out of the way of the rod 42. Pivot is illustrated in FIG. 2. Thus vertical oscillation of the floats 14, 16, 18, 20, 22, 24 acts on the rotatable power collector 26 in only one direction. While the rotatable power collector 26 is depicted as being rotated by the floats 14, 16, 18, 20, 22, 24 when descending, it would be possible to operate in the opposite direction. However, actual models have exhibited superior performance when transmission of force occurs in the descending direction.

Regardless of which scheme is selected, each float such as the float 24 will be understood to comprise a unidirectional control disposed to cause rotation of the driven member (such as the rod 42) to be operable in one direction of rotation of the driven member and ineffectual in an opposed direction of rotation of the driven member.

Figure 3:
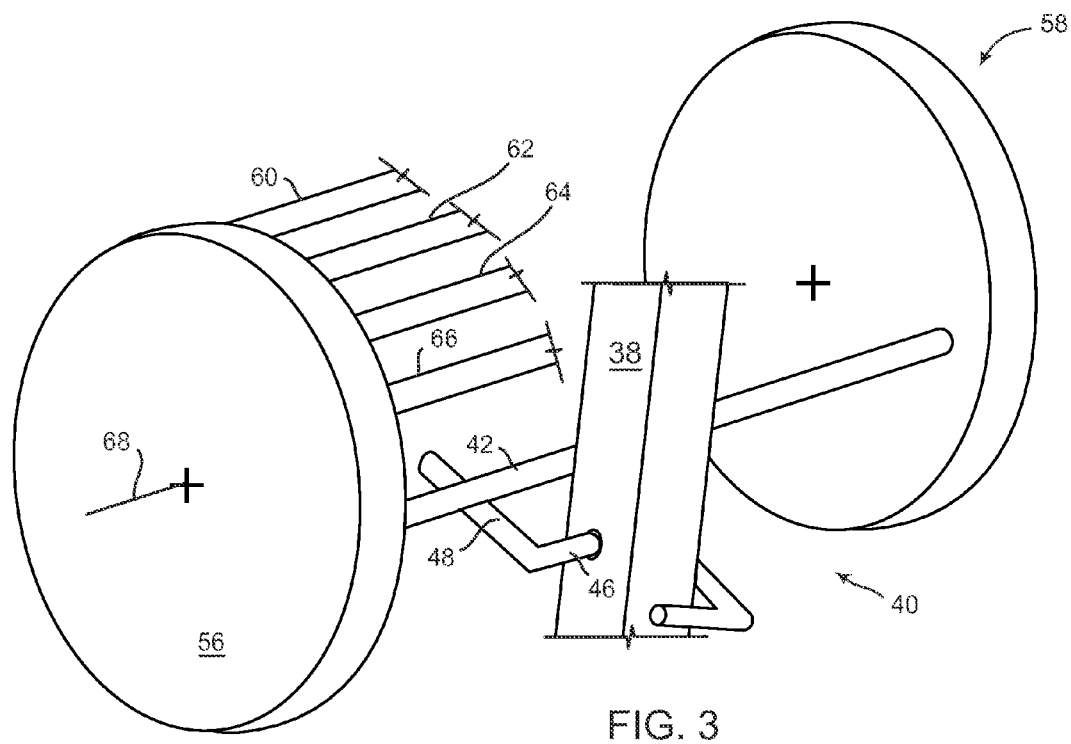
FIG. 3 is an enlarged fragmentary perspective detail view of a component seen in FIG. 1 to extend generally from the lower left to the upper right.

As further seen in FIG. 3, the rotatable power collector 26 comprises a plurality of driven members comparable to the rod 42 each drivably engageable with the drive fingers of the floats (such as the drive finger 40 associated with the float 24). The rotatable power collector 26 is further seen to comprise a first end disc 56, an opposed second end disc 58 spaced apart from the first end disc 56, and a plurality of rods 42, 60, 62, 64, 66 spanning and connecting the first end disc 56 and the second end disc 58. Of course, the number of rods is sufficient to enable engagement by the drive fingers such as the drive finger 40 regardless of the degree of rotation of the rotatable power collector 26. The rods of the plurality of rods such as the rods 42, 60, 62, 64, 66 may be parallel to and spaced apart from one another by equal spacing intervals from the axis of rotation 68 of the rotatable power collector 26.

Each rod of the rotatable power collector 26, such as the rods 42, 60, 62, 64, 66, serves as a driven member which of course could take other forms. The drive fingers such as the drive finger 40 each engage one driven member and push that driven member about an arc of travel as the floats such as the float 24 oscillate vertically responsively to passing of the surface waves 2.

FIGS. 4-8 illustrate action of the drive finger 40 in progressive stages of one cycle which is repeated as long as there are waves 2. It should be noted that the scheme of operation illustrated in FIGS. 4-8 shows driving engagement of the rotatable power collector 26 during descent of the float 24, rather than during ascent, the latter having been depicted in FIG. 3.

Figure 4:
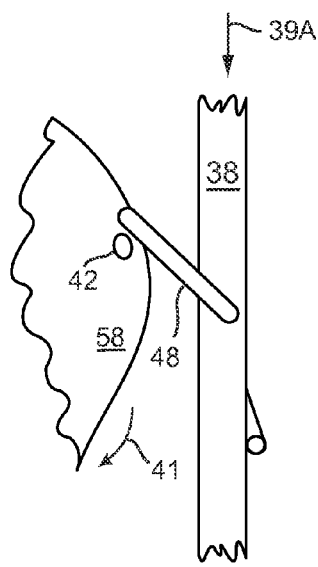
FIG. 4 is an enlarged side detail view of components seen at the right of FIG. 1, illustrating an arbitrarily selected stage of events which occur during operation of the generator of FIG. 1.

In FIG. 4, the rod 38 is descending as a wave 2 recedes after passing by, descent being indicated by an arrow 39. The drive section 48 of the drive finger 40 presses downwardly on the rod 42 of the rotatable power collector 26, thereby rotating the latter in a direction called out by the arrow 41.

Figure 5:
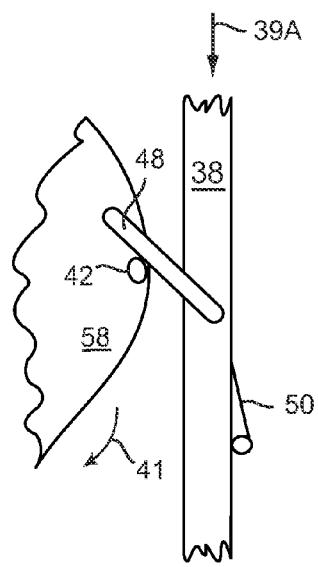
FIG. 5 is similar to FIG. 4, but shows a subsequent stage of events.
Figure 6:
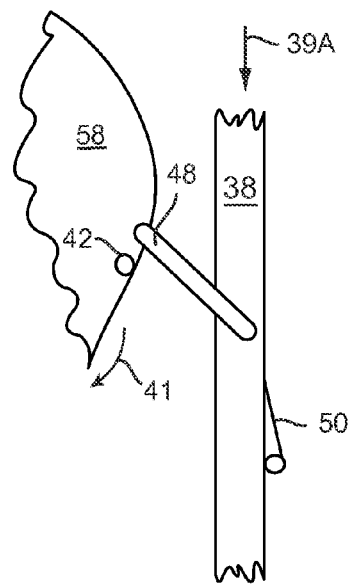
FIG. 6 is similar to FIG. 5, but shows a further stage of events.

FIG. 5 shows a further degree of descent of the rod 38, wherein the rod 42 has been rotated downwardly and, as depicted in FIGS. 4-8, clockwise. As the upper end of the drive section 48 continues to descend, the rod 42 rotates out of contact with the drive section 48 (FIG. 6).

Figure 7:
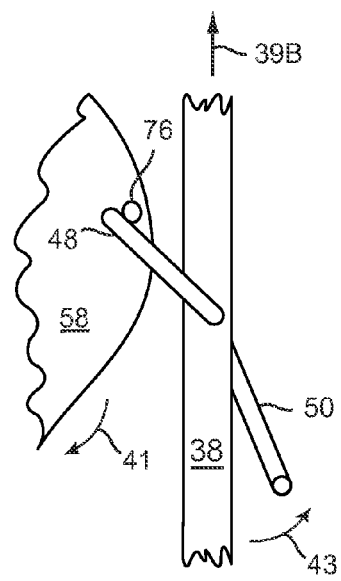
FIG. 7 is similar to FIG. 6, but shows a different aspect of events of operation of the generator of FIG. 1.
Figure 8:
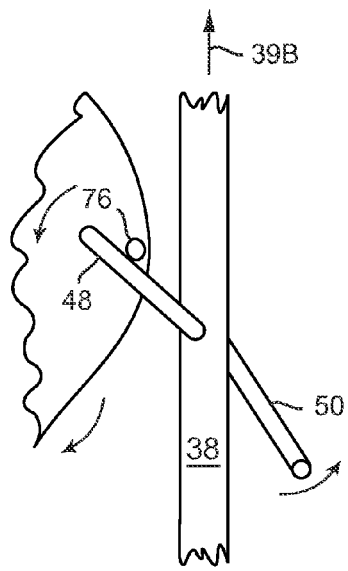
FIG. 8 is similar to FIG. 7, but shows a still further stage of events.

The stage is now set for upward movement of the rod 38, as indicated by the arrow 39B. This is shown in FIG. 7. As the drive section 48 engages an approaching new rod 76, the drive finger 40 yields to allow the new rod 76 to pass thereby. This is enabled by the relationship of the travel limit section 50 to the drive section 48. The travel limit section 50 pivots counterclockwise as seen in FIGS. 7 and 8, thereby allowing continued clockwise rotation of the rotatable power collector 26 (again, rotation is indicated by the arrow 41), while enabling the rod 38 to ascend (indicated by the arrow 39B) while not transmitting force to the rotatable power collector during ascent.

Referring again to FIG. 1, the floats 14, 16, 18, 20, 22, 24 are arrayed linearly, and parallel to the axis of rotation 68 of the rotatable power collector 26. This is one of many possible configurations of the array of floats such as the 14, 16, 18, 20, 22, 24. Although the floats 14, 16, 18, 20, 22, 24 appear to be at equal heights, it is contemplated that in practice, they may be at different heights, depending on the random nature of the surface of the body of water 4. Displacement of the floats such as the float 24 and their associated rods such as the rod 38, due to wave action, is indicated by arrows 82 in FIG. 9. The overall diameter of the rotatable power collector 26, indicated by an arrow 84, is on the order of five times the magnitude of displacement of the floats. These characteristics, among others, enable a generator such as the generator 10 to be small and portable. Interestingly, the novel arrangement is operable even on small waves 2 such as ripples which are ordinarily present in a swimming pool (not shown) for example, which ripples are caused by people moving about in the water.

Such a generator is suitable not only for generating usable power, but also for education and demonstration concerning wave energy and electrical generation. Illustratively, small scale models utilized in swimming pools, ponds, and other bodies of water may be intended only to illustrate operating principles, and not necessarily to generate useful amounts of power. It will be recalled that the floats 14, 16, 18, 20, 22, 24 are constrained to move vertically. This is accomplished by a two tiered yoke established by frame cross members 80, 82, each of which is disposed to encircle each one of the rods of the floats 14, 16, 18, 20, 22, 24 at two spaced apart points along the length of each one of the rods. The frame cross members 80, 82 are of course fixed to the structural frame 12.

Figure 10:
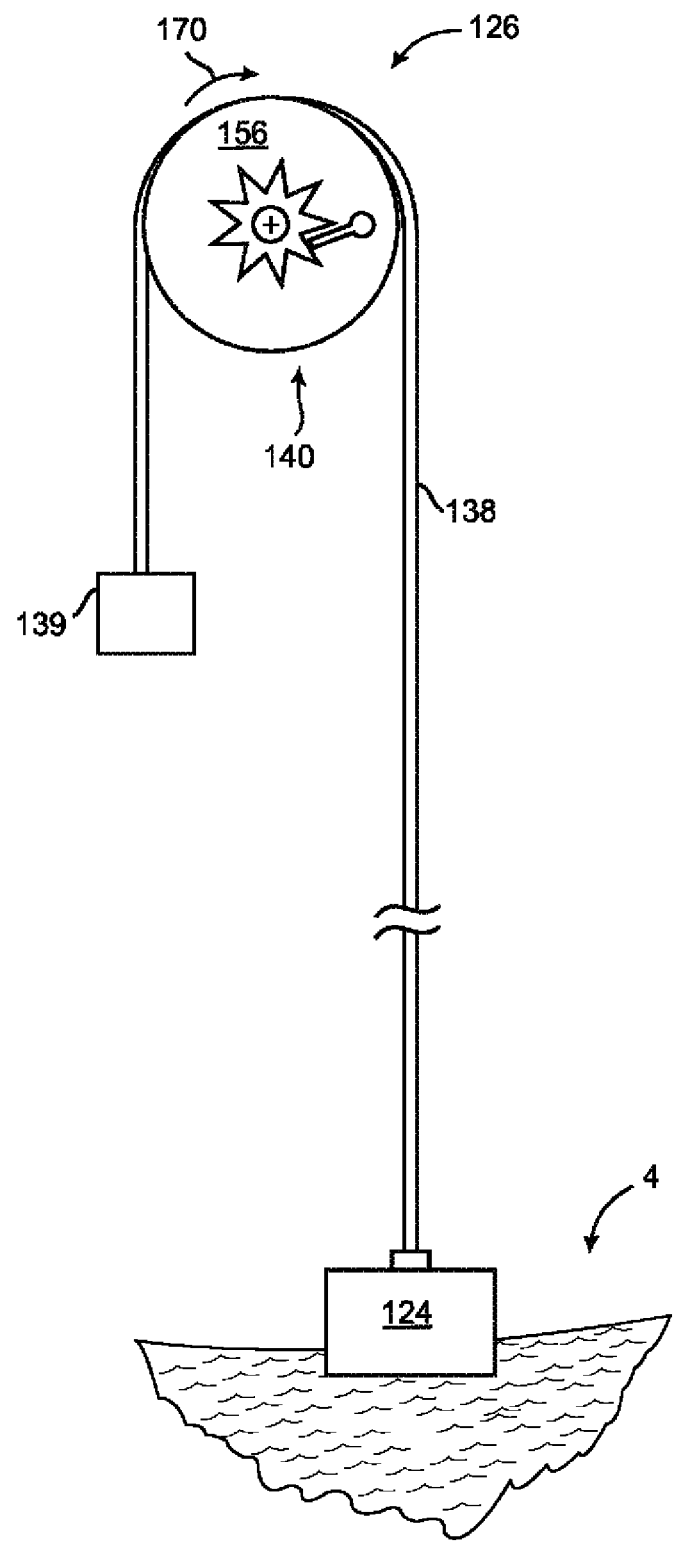
FIG. 10 is a side detail view of a variation on the generator of FIG. 1.

FIG. 10 shows a variation on the power collection scheme of the generator of FIG. 1. A rotatable power collector 126 may comprise a pulley or reel 156 about which is disposed a flexible drive element such as a belt 138. The belt couples a float 124 to the reel 156. The reel 156 may be constrained to rotate in only one direction (indicated by an arrow 170) by a ratchet assembly 140. The free end of the belt 138 may be connected to a counterweight 139, or alternatively, wound around the reel 156 (this option is not shown), or disposed in any other manner enabling operation as described herein. The counterweight 139 may be disposed to counter the influence of the float 124 on the rotatable power collector 126 as the float 124 rises and falls responsively to passing of the waves 2, in particular, keeping the belt 138 taut.

Figure 11:
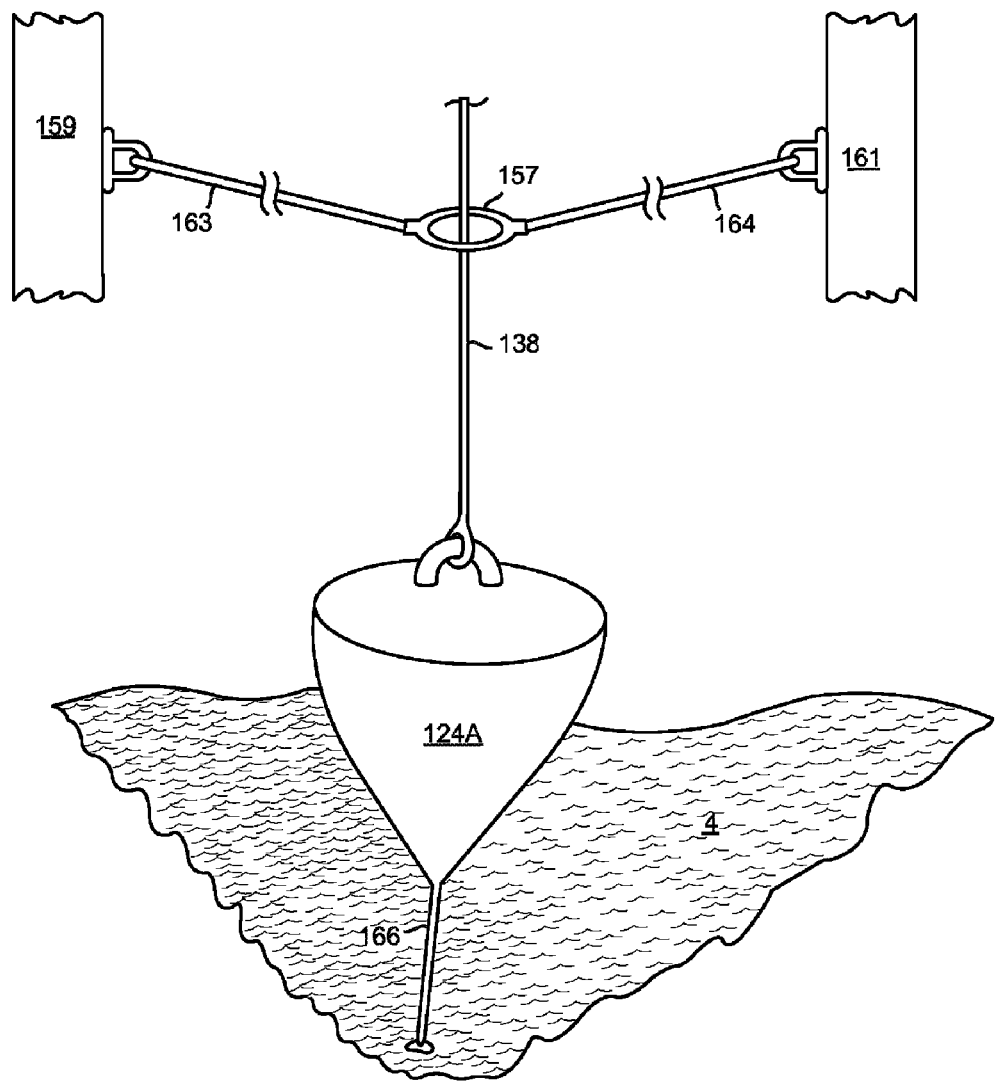
FIG. 11 is an enlarged detail view of a float seen towards the bottom of FIG. 10.

Also, and referring now to FIG. 11, the arrangement of FIG. 10 may be improved by stabilizing the belt 138 and by providing an optimum configuration to the float 124A. The belt 138 may be restrained by a surrounding yoke 157 which in turn may be anchored to any suitable structural members 159, 161 of the frame of the generator by guy wires 163, 164. The guy wires 163, 164 may be flexible or alternatively may comprise rigid stays (this option is not shown). The float 124A may be tapered, with the small end facing the water. A keel 166 may be formed as part of the float 124A.

The rotatable power collector 126 may have a plurality of floats and drive belts similar to the float 124 and the belt 138, and counterweights such as the counterweight 139.

Other than the nature of the drive comprising the reel 156, the flexible belt 138, floats such as the float 124, and other components effecting operation of the reel 156, which drive which may correspond in function to the drive 30 of the generator 10, the drive arrangement described with reference to FIG. 10 may be utilized with a generator (not shown) which may be similar in structure and function to the generator 10 of FIG. 1.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible

I claim:

1. A generator adapted to exploit surface waves of a body of water to generate electrical power, comprising:
    a structural frame;
    a plurality of floats coupled to the structural frame and constrained by the structural frame to oscillate vertically responsively to passing of surface waves;
    a rotatable power collector disposed to be rotated in one and only one direction by oscillation of the floats, each float being individually coupled to the rotatable power collector;
    a rotary generator supported on the structural frame; and
    a drive disposed to receive rotary inputs from the rotatable power collector and to transmit rotation to the rotary generator, wherein
    each float comprises a rod projecting upwardly therefrom, and a drive finger fixed to the rod, and further wherein
    the rotatable power collector comprises a plurality of driven members each drivably engageable with the drive fingers of the floats, whereby the drive fingers of the floats push one driven member about an arc of travel as the floats oscillate vertically responsively to passing of the surface waves.

2. The generator of claim 1, wherein each float comprises a unidirectional control disposed to cause rotation of the driven member to be operable in one direction of rotation of the driven member and ineffectual in an opposed direction of rotation of the driven member.

3. The generator of claim 2, wherein the drive finger is mounted to the rod in a manner such that the drive finger is pivotal between a drive position in which the drive finger rotates the driven member, and a retracted position in which the drive finger does not rotate the driven member.

4. The generator of claim 3, wherein the drive finger comprises a wire journaled within the rod of the float and bent to form
    a drive section which engages the rotatable power collector, and
    a travel limit section which establishes interference with the rod of the float when a predetermined degree of rotation within the rod has been attained.

5. The generator of claim 1, wherein the plurality of floats are arrayed linearly.

6. The generator of claim 5, wherein the plurality of floats are arranged parallel to the axis of rotation of the rotatable power collector.

7. The generator of claim 1, wherein the rotatable power collector comprises a first end disc, an opposed second end disc spaced apart from the first end disc, and a plurality of rods spanning and connecting the first end disc and the second end disc, wherein the plurality of rods are parallel to and spaced apart by equal spacing intervals from the axis of rotation of the rotatable power collector.

8. The generator of claim 1, further comprising a two tiered yoke disposed to encircle each one of the rods of the floats at two spaced apart points along the length of each one of the rods of the floats, and wherein the two tiered yoke is fixed to the structural frame.

9. The generator of claim 1, wherein the drive comprises a speed modification feature disposed to receive rotary inputs from the rotatable power collector at a first rate of rotation and to transmit rotation which causes the rotary generator to rotate at a second rate of rotation which is different from the first rate of rotation.

* * * * *